United States Patent
Sankaranarayanan et al.

(10) Patent No.: US 8,191,045 B2
(45) Date of Patent: May 29, 2012

(54) MINING LIBRARY SPECIFICATIONS USING INDUCTIVE LEARNING

(75) Inventors: Sriram Sankaranarayanan, Plainsboro, NJ (US); Franjo Ivancic, Jersey City, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1107 days.

(21) Appl. No.: 12/050,624

(22) Filed: Mar. 18, 2008

(65) Prior Publication Data

US 2009/0064110 A1    Mar. 5, 2009

Related U.S. Application Data

(60) Provisional application No. 60/969,761, filed on Sep. 4, 2007.

(51) Int. Cl.
G06F 9/44 (2006.01)
G06F 9/445 (2006.01)

(52) U.S. Cl. .................. 717/124; 717/127; 717/129

(58) Field of Classification Search .......... 717/124–131, 717/141–143
See application file for complete search history.

(56) References Cited

U.S. PATENT DOCUMENTS

| | | | | |
|---|---|---|---|---|
| 5,642,472 | A * | 6/1997 | Cohen ........................... | 706/12 |
| 6,505,342 | B1 * | 1/2003 | Hartmann et al. ............ | 717/104 |
| 6,601,018 | B1 * | 7/2003 | Logan ........................... | 702/186 |
| 6,701,514 | B1 * | 3/2004 | Haswell et al. ............... | 717/115 |
| 6,948,153 | B2 * | 9/2005 | Bowers ......................... | 717/124 |
| 7,069,234 | B1 * | 6/2006 | Cornelius et al. ............ | 705/80 |
| 7,165,041 | B1 * | 1/2007 | Guheen et al. ............... | 705/26.1 |
| 7,284,237 | B2 * | 10/2007 | Blumenthal et al. .......... | 717/124 |
| 7,315,826 | B1 * | 1/2008 | Guheen et al. ............... | 705/7.29 |
| 7,363,616 | B2 * | 4/2008 | Kalyanaraman .............. | 717/124 |
| 7,392,507 | B2 * | 6/2008 | Kolawa et al. ................ | 717/124 |
| 7,529,643 | B2 * | 5/2009 | Nyberg ......................... | 702/182 |
| 7,565,648 | B2 * | 7/2009 | Kline et al. ................... | 717/143 |
| 7,797,687 | B2 * | 9/2010 | Tillmann et al. ............. | 717/131 |
| 7,844,951 | B2 * | 11/2010 | Chen et al. .................... | 717/124 |
| 7,900,201 | B1 * | 3/2011 | Qureshi et al. ............... | 717/174 |
| 7,917,897 | B2 * | 3/2011 | Bassin et al. ................. | 717/131 |
| 7,930,683 | B2 * | 4/2011 | Li .................................. | 717/124 |
| 7,954,090 | B1 * | 5/2011 | Qureshi et al. ............... | 717/127 |
| 8,074,204 | B2 * | 12/2011 | Comstock et al. ............ | 717/125 |
| 2004/0010776 | A1 | 1/2004 | Shah | |
| 2005/0086647 | A1 | 4/2005 | Ito et al. | |
| 2005/0216891 | A1 | 9/2005 | Sundararajan et al. | |

OTHER PUBLICATIONS

Le et al, "Name entity recognition using inductive logic programming", ACM SoICt, pp. 71-77, 2010.*
Cheatham et al, "Software testing: A machine learning experiment", ACM, pp. 135-141, 1995.*
Royer et al, "An application of machine learning to the problem of parameter setting in non destructive testing", ACM, pp. 972-980, 1990.*
Xie et al, "Towards a framework for differential unit testing of object oriented programs", IEEE AST, pp. 1-7, 2007.*
Hamelt, "Subdomain testing o funits and systesm with state", ACM ISSTA, pp. 85-95, 2006.*

* cited by examiner

*Primary Examiner* — Anil Khatri

(74) *Attorney, Agent, or Firm* — James Bitetto; Joseph Kolodka

(57) ABSTRACT

A system and method for mining program specifications includes generating unit tests to exercise functions of a library through an application program interface (API), based upon an (API) signature. A response to the unit tests is determined to generate a transaction in accordance with a target behavior. The transaction is converted into a relational form, and specifications of the library are learned using an inductive logic programming tool from the relational form of the transaction.

14 Claims, 2 Drawing Sheets

| | fnRes1 |
|---|---|
| op₁ | stack_t* o₁ |
| op₂ | int 0 |
| op₃ | stack_t* o₂ |
| op₄ | stack_t* o₃ |
| op₅ | stack_t* o₄ |
| op₆ | stack_t* o₅ |
| op₇ | stack_t* o₆ |

| | fnArg2 | |
|---|---|---|
| op₄ | elt_t* | ptr0x32 |
| op₅ | elt_t* | ptr0x45 |

| | fnRes2 | |
|---|---|---|
| op₆ | elt_t* | ptr0x0 |
| op₇ | elt_t* | ptr0x45 |

| | fnArg1 | |
|---|---|---|
| op₁ | int | 10 |
| op₂ | stack_t* | o₁ |
| op₃ | int | 2 |
| op₄ | stack_t* | o₂ |
| op₅ | stack_t* | o₃ |
| op₆ | stack_t* | o₁ |
| op₇ | stack_t* | o₄ |

| | fnCalled |
|---|---|
| op₁ | createStack |
| op₂ | length |
| op₃ | createStack |
| op₄ | pushStack |
| op₅ | pushStack |
| op₆ | popStack |
| op₇ | popStack |

| opSucc | |
|---|---|
| op₁ | op₂ |
| op₁ | op₃ |
| ••• | ••• |
| op₁ | op₇ |
| op₂ | op₃ |
| ••• | ••• |
| op₂ | op₇ |
| op₃ | op₄ |
| ••• | ••• |

FIG. 3

MINING LIBRARY SPECIFICATIONS USING INDUCTIVE LEARNING

RELATED APPLICATION INFORMATION

This application claims priority to provisional application Ser. No. 60/969,761 filed on Sep. 4, 2007, incorporated herein by reference.

BACKGROUND

1. Technical Field

The present invention relates to computer software, and more particularly to mining interface specifications using inductive logic to permit interfacing with different software programs and libraries.

2. Description of the Related Art

Software libraries are ubiquitous mechanisms for organizing widely useful functionalities to promote modularity and code reuse. A typical software library is used by client programs through an application program interface (API) with the library internals hidden from the client. Typically, the rules governing the correct usage of the API are documented informally. In many cases, libraries may have complex API usage rules and unclear documentation. As a result, the behavior of the library under some corner cases may not be well understood by the programmer. Therefore, obtaining formal specifications for such libraries is useful for software verification.

Software libraries are used frequently to promote modularity and code re-use. Common examples of libraries include operating system functionalities such as threads, files and sockets; data structure implementations such as stacks, queues, lists and hash tables; utilities for reading, writing and interpreting codecs; database processing and so on. The functionalities provided by a library are exported through an interface (API). Usage rules are formulated to govern the proper usage of an interface. These interface usage rules are usually a combination of two types of rules: (a) preconditions on the arguments of function calls and (b) admissible sequences of function calls to the API. Any violation of the API usage norms can lead to faulty or unpredictable behavior in programs.

In theory, the restrictions on the calls to an API can be formally specified along with the API. In practice, however, specifications of API behavior and restrictions on its usage are stated informally in a natural language. Such specifications may be ambiguous or even inaccurate. These specifications cannot therefore be used in verification systems. Often, informal specifications may not specify all the corner case behaviors. Existing verification tools such as SLAM™, Blast™, ESP™ and F-Soft™ can make use of formal specifications of valid/invalid usages of a given API, and automatically check application code for conformance. Such tools mostly rely on the user to provide specifications for the library APIs used by the application. The process of manually writing the specifications for APIs is cumbersome and prone to errors. Therefore, it is desirable to have automatic techniques to learn such specifications.

There are two types of approaches to learning specifications. The first type of approach starts by analyzing many trusted applications that use the library under consideration, whereas the second type of approach analyzes the library itself. Furthermore, approaches for inferring specifications may be static or dynamic. Static approaches analyze the source code to extract these specifications while dynamic approaches infer the required behavior by analyzing the runtime behavior. Finally, approaches may be geared towards different types of specifications of the API's behavior. Some techniques learn preconditions for function call parameters expressed in a suitable constraint language. Other techniques derive automata-based characterizations of legal/illegal calling sequences.

SUMMARY

A system and method for mining program specifications includes generating unit tests to exercise functions of a library through an application program interface (API), based upon an (API) signature. A response to the unit tests is determined to generate a transaction in accordance with a target behavior. The transaction is converted into a relational form, and specifications of the library are learned using an inductive logic programming tool from the relational form of the transaction.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is a diagram illustratively showing relations generated by transactions on the stack API of FIG. 2.

DETAILED DESCRIPTION OF PREFERRED EMBODIMENTS

The present principles provide systems and methods for learning interface specifications using inductive logic programming (ILP). The present embodiments run several unit tests on a library to generate relational data describing the operation of the library. The data collected from these tests can be used by an inductive learner to obtain rich datalog/prolog specifications that capture essential properties of interest to the user. The resulting specifications may be used to reverse engineer the library internals. The specifications may also be used to construct checks on the application code that uses the interface to avoid exceptional conditions. Other advantages and benefits are also achieved in accordance with the present principles.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
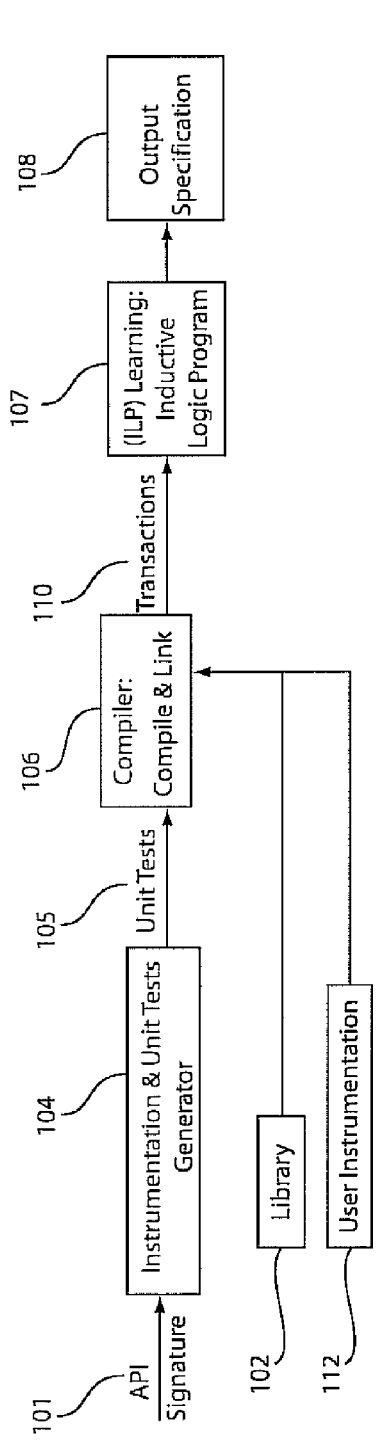
FIG. 1 is a block/flow diagram showing a system/method for learning specifications using inductive learning in accordance with the present principles.

Referring now to the drawings in which like numerals represent the same or similar elements and initially to FIG. 1, a system/method 100 to automatically infer declarative specifications of an API's behavior is illustratively shown. The system/method 100 analyzes runtime behavior of a library 102. System/method 100 accepts a compiled library along with many unit tests 105 as inputs, and outputs declarative specifications learned 108. In many cases, unit test generator 104 can automatically generate unit tests 105 using random unit testing. The test generator 104 for this purpose uses a header file describing function behavior with very few extra annotations over a standard C language header and a description of the target concept to be specified (such as exceptions raised, or function return values and so on). The type of libraries may be in any language (e.g., C, Java, etc.) or application (image processing, database, containers, data structures, etc.) or operating system (Windows™, Linux™, etc.).

Using random test generation, the present methods can be made automatic. The advantages of this approach are that the behaviors learned are over actual program executions. On the other hand, exhaustive test generation may be needed to infer all behaviors, which may be infeasible, especially using random test generation.

Since the source code of the library is not needed, the present system 100 is suited for applications such as reverse engineering. The resulting data from the tests are output in the form of relations that describe the operations performed on the library 102 along with the responses. Declarative specifications 108 can be learned from these relations using relational data mining techniques such as inductive logic programming (ILP) in block 107.

The derived specifications 108 are written in languages such as prolog/datalog and have been used in software engineering practice to specify the behavior of interfaces. These specifications 108 are expressive. They permit constraints on arguments of function calls as well as characterizations of calling sequences. Inductive logic programming (ILP) 107 includes a class of techniques for learning a Datalog (Prolog) specification for a given target relation (predicate) p in terms of relations $p_i, \ldots, p_m$. The input data to an ILP problem includes tuples that belong to each of the relations $p_i, \ldots, p_m$ as well as positive and negative examples of the target relation p.

ILP tools can also use some user provided background information about the predicates along with restrictions on the desired form of the specifications to infer a set of Horn clause rules that explain the target in terms of the data.

FIG. 1 shows an approach to learning specifications. Given an API signature 101 describing the types and methods involved in the API along with some information about the method side effects, we automatically generate random unit tests 105 that exercise some of the functions in the API 101. The tests 105 are also instrumented to observe the system's response to the functions and print a log of the inputs/outputs. This log is called a transaction 110. The unit tests 105 generated by instruction and unit test generator 104 are compiled and linked by a compiler 106 with some additional user defined instrumentation 112 that defines the target behavior of interest to the user. One method used to generate the unit tests includes random unit tests. Commonly sought targets may include the raising of an exception or other abnormal termination during the test execution, the returning of a special value by a function, printing of a certain output and so on. The specifications sought express the occurrence of the target in terms of the usage pattern inherent in the unit test 105. After execution, the resulting transactions are converted into a relational form and fed to an inductive logic programming (ILP) tool 107 that learns the specifications.

The ILP engine 107 is used as a "black box". It is possible to streamline the specification learning by providing background knowledge in the form of structural annotations that restrict the type of specifications allowed as well as user defined predicates that may need to be a part of the output but are not built into the ILP tool 107. The ILP engine or ILP methodology may be performed using different techniques.

Figure 2:
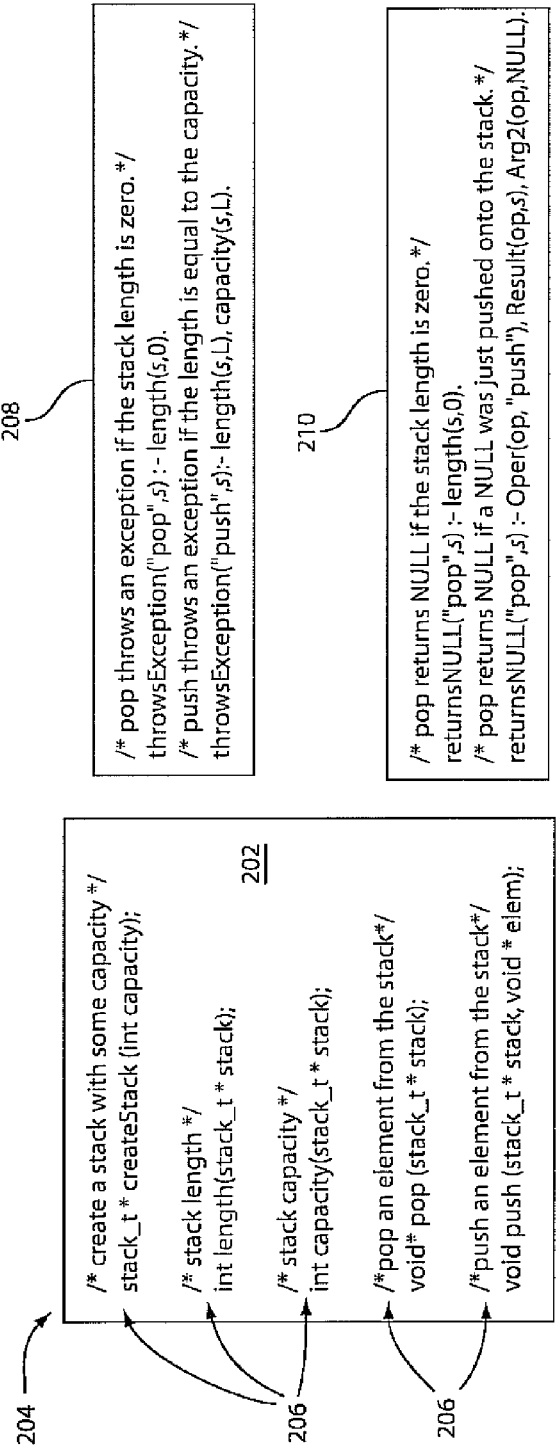
FIG. 2 is a diagram showing an application program interface for stack implementations along with behavior of two implementations for push/pop operations for demonstrating the present principles.

Referring to FIG. 2, consider a stack data structure 202 with an API 204 as shown. The API 204 specifies the functions 206 that are part of an interface. API 204 may however be implemented in numerous ways such that each implementation behaves similarly for "normal" usage while exhibiting different behaviors for corner cases. Developers who use these libraries are often provided details of the interface with informal specifications that may fail to specify the behavior under such corner cases. The usage of the library is usually left to "common sense".

Two such corner cases 208 and 210 pertaining to the stack implementation include calling pop on an empty stack (208) and push on a stack that has reached its capacity (210). Consider implementation 208 that raises an exception for either case, requiring the user to check the stack length before calling pop. On the other hand, we consider another implementation 210 that returns a NULL pointer upon popping an empty stack.

FIG. 2 shows the specifications 208 and 210 written in a declarative formalism. The specification 208 for library A predicts the raising of an exception on pop while the specification 210 for library B predicts the return of a NULL pointer. The specification 210 for B shows that it is possible for a pop to return NULL pointer if a NULL pointer has been pushed onto the stack by an operation whose return stack is the argument to the pop. Therefore, to safely infer that the stack is NULL, the user of the library B may have to check the length of the stack rather than the return value of the pop function. While the example may be contrived, many libraries in real life tend to be poorly or improperly specified. This can lead to many defects in the software.

Prolog/datalog specifications for software libraries are automatically inferred. We assume knowledge of the interface functions without requiring the source code of the actual implementation. Examples of libraries considered include data structures such as stacks, queues and system services such as file I/O, sockets and so on. One goal is to infer specifications that predict interesting events such as a function raising an exception or returning a value of interest to the user. We will demonstrate the use of such specifications in exposing quirks in the implementation and also in formulating analyses that predict the presence of bugs in implementations that use the library.

Declarative specifications for interfaces and basic theory behind learning such specifications from relational data will now be described.

Declarative Specifications: Declarative specifications are commonly used to specify software libraries. Declarative specifications can capture permissible sequences of calls to the API as well as the data preconditions that may need to hold when a function is called. We focus on declarative specifications expressed in the datalog framework for illustrative purposes.

Let L be a first order language over some signature $\Sigma$ including constants $c_0, \ldots, c_k$ and predicates $p_1, \ldots, p_j$, with a set of typed variables $x_1, \ldots, x_n$ taking values from some domains $D_1, \ldots, D_m$. We assume a distinguished target or goal predicate p that we wish to characterize in terms of the other predicates $p_1, \ldots, p_j$. Informally, a declarative specification is a disjunction of Horn clauses $C_1, \ldots, C_n$, where each clause $C_i$ is of the form:

$C_i$: $p_{i_1}(t_{11}, \ldots, t_{m1})^\wedge \ldots \Rightarrow p_{i_m}(\ldots)^\wedge p(t_1, \ldots, t_n)$, where $t_{ij}$ denotes a term constructed using free variables $x_i, \ldots, x_m$, and constants, while $\Rightarrow$ is used to denote implication. Following datalog convention, such a clause is written as $p(t_1, \ldots, t_n) :- p_{i_1}(\ldots), p_{i_2}(\ldots), \ldots, p_{i_n}(\ldots).$ It is possible to extend the definition of a clause to consider recursion where p itself may be part of the left hand side of the implication. The fixed point semantics for the target predicate p can be shown to exist in the absence of the negation operator. The signature can be extended using function symbols of arity 1 or greater (constants being assumed to be functions of arity 0), to yield the full power of Prolog specifications.

EXAMPLE 1

Consider the domain of human population along with the standard notion of biological father and mother. We assume predicates such as mother(m, p) and father(f, p), denoting that m (f) is the (biological) mother (father) of p. It is possible to characterize the familiar concept of "grandfather" using the following datalog specification.
 grandfather(x, y):—father(x, z), mother(z, y).
 grandfather(x, y):—father(x, z), father(z, y).
Similarly the concept of a (biological) ancestor can be expressed using the following clauses:
 ancestor(x, y):—father(x, y).
 ancestor(x, y):—mother(x, y).
 ancestor(x, y):—ancestor(x, z), ancestor(z, y).

Declarative specifications can be used to capture useful behavioral properties of APIs such as permissible calling sequences, function call preconditions, predicting return values and so on. Before doing so, however, one needs to fix a first order language that describes APIs, the objects that they manipulate and the results, so that meaningful specifications can be expressed (later induced).

Interfaces: Let $T = \{t_1, \ldots, t_m\}$ be a set of types which include basic types such as int and char, along with compound types constructed by aggregating basic types into structures and arrays. We assume for the time being that the composition or structure of compound types are unknown to us.

A function signature f is of the form $(t_1', \ldots, t_n') \leftarrow f(t_1, \ldots, t_m)$, wherein $t_1, \ldots, t_m$ denote the types of the arguments to the method for some $m \geq 0$ and $(t_1', \ldots, t_n')$ denote the output types. We assume for simplicity that functions do not access or modify objects other than those passed as formal arguments and the state of the operating environment (memory allocators, file output and so on).

With each function f, we also associate a set of argument indices that are destroyed as a result of the call. To handle a function with side-effects written in a language such as C, we model all the inputs (formal arguments, static variables and global variables) to the functions as arguments and model all its side effects by means of the result parameters. Nevertheless, we do not consider the resulting functions to be pure. For instance, it is possible for a function that allocates an object of a specific size to return different objects on different calls with the same size parameter. Such functions can be considered pure only if the entire operating environment (stack, heap, o/s state, etc.) are treated as inputs. Arguments that are modified by the functions are treated as being destroyed while the modified version is treated as a return parameter. The + superscript will be used to denote arguments that are destroyed by the call.

Another complication that arises in imperative languages is that of sharing, wherein an update to an object o can affect all the other objects that may share or alias some constituent of o. We assume for the time being that no such sharing occurs and functions operate purely on the objects passed to them as arguments.

EXAMPLE 2

The function signatures for the functions in the stack API shown in FIG. 2 are as follows:
 stack_t* ← create_stack(int)
 int ← length(stack_t*)
 int ← capacity(stack_t*)
 stack_t* ← create_stack(int)
 stack_t* ← push_stack(stack_t*+, elt_t)
 (stack_t*, elt_t) ← pop_stack(stack_t*+)
 void ← free(stack_t*+)

A function signature L forms a query iff all its results are basic types while none of its arguments are destroyed. A query is assumed to return some attribute of the objects input to them. Similarly, functions that reclaim the memory allocated to compound objects are called destructors. These are assumed to destroy their compound arguments and return only basic types. Functions can also be labeled as allocators. Such functions accept basic types as inputs and produce a return value of a compound type. Many libraries permit allocators that take compound objects as inputs. In such libraries, there is a linear type hierarchy among types so that the inputs for an allocator are always smaller in the type hierarchy than the output.

An interface signature over a set of types T is a set of function signatures: Func. Some of the functions in an interface may be labeled as allocator, destructor or query functions.

EXAMPLE 3

Returning to the stack interface in FIG. 2, we can define an interface signature with a type stack_t. The allocator for stack_t includes the singleton createStack, the query functions include length, capacity. The functions push and pop modify their stack argument. The function free is a destructor for objects of type stack_t.

Deriving Relations: As the basis of our framework, we show that a sequence of operations on a given interface can be described relationally. These relations will form the predicates that will be used to learn specifications. Given an API, a transaction O is a sequence of function calls to the interface functions along with their results:
 $op_1$: $(O_1) \leftarrow f_1(I_1)$
 $op_2$: $(O_2) \leftarrow f_2(I_2)$
 ⋮
 $op_n$: $(O_n) \leftarrow f_n(I_n)$ Each operation is of the form $op_j$: $(O_j) \leftarrow f_j(I_j)$ where $op_j$ is its operation ID, $O_j$ denotes the tuple of objects output by the call to function $f_j$, while $I_j$ denotes the tuple of arguments to the function call. Every compound argument o to an operation $op_i$ in the sequence should be obtained as the result of an earlier operation $op_j$ in the sequence. Also, o should not be destroyed by any of the intermediate operations $op_k$ for $i < k < j$.

Note that a transaction is different from a unit test (105, FIG. 1). While a unit test is a test program that exercises a sequence of functions in the library, a transaction is a description of a set of function calls to a library as well as the result of those calls. We denote the operations in a transaction as $op_1, \ldots, op_n$. As a result of our restrictions, it follows that inputs to the first operation cannot be compound. Given a transaction, we may describe it equivalently using some built-in relations. The relations describe the sequence of operations, the functions called by each operation and the result of each operation.

Each operation in a transaction is given a unique ID. We assume a domain Oper of all the operation IDs. Similarly, each compound object involved in the transaction is provided an ID. The IDs of arguments and results of basic types such as integers, characters and strings are simply given by their values and addresses. To describe each operation, we need to describe (a) the function called by the operation, (b) the object IDs and values for the basic-typed arguments, and (c) the object IDs and the values of the results.

The predicates used in FIG. 3 are summarized below:

The values $op_1, \ldots, op_k$, belong to the domain of operations. The succession between the operations is modeled by $opSucc(op_i, op_j)$, where $i>j$.

The predicate $fnCalled(op_i, f_i)$ will be used to denote that operation op, involves a call to function The predicate $fnArg_i(op_j, t_i, o_{ij})$ is used to denote that object ID is the $i^{th}$ argument to function called by $op_j$ and is of type $t_i$. This predicate is assumed to be polymorphic with different types for $o_{ij}$ depending on the transaction.

The predicate $fnRes; (op_j, t_i, d_j,)$ denotes that object ID $o'_{ji}$ is the result of the function called by opt.

EXAMPLE 4

Consider the following transaction on the Stack API (202) shown in FIG. 2. Transaction 1:

| | |
|---|---|
| $op_1$: | $o_1$←createStack(10) |
| $op_2$: | 0 ← length($o_i$) |
| $op_3$: | $o_2$ ← createStack(2) |
| $op_4$: | $o_3$←pushStack($o_2^+$, ptrOx32) |
| $op_5$: | $o_4$←pushStack($o_3^+$, ptrOx45) |
| $op_6$: | ($o_5$, ptrOx0) ← popStack($o_1^+$) |
| $op_7$: | ($o_6$, ptrOx45) ←popStack($o_4^+$) |

Note that arguments destroyed by the function calls are denoted by a + superscript. Base types and pointers to them are denoted by their values and addresses respectively. Note that all stacks are uniquely identified by their object IDS which are incremented whenever an operation produces a new stack.

Referring to FIG. 3, a relational view of transaction 1 is illustratively shown. FIG. 3 shows relations generated by transaction 1 on the stack API 202 of FIG. 2.

Active objects & Query Closure: Let $f_1, \ldots, f_k$ be query methods in an API. Given a transaction, the active objects for an operation $op_i$, are defined to be the set of objects $o_1, \ldots, o_m$ that have been created by a preceding operation $op_j$, where $j<i$ and not subsequently destroyed by some intermediate operation $op_k$ for $j<k<i$.

EXAMPLE 5

The active set at the beginning of transaction $op_5$, in Example 4 are $\{o_1, o_3\}$. Note that $o_2$ is destroyed by the call in $op_4$ and hence considered inactive.

The query closure for operation $op_i$ is a set of function calls to each query function $f_i$ in the API called on every object that is created by performing the operation $op_i$. The query closure of a transaction includes adding query calls before every operation $op_j$. Since query functions are assumed not to destroy their arguments and return basic types, we distinguish the running of query functions from the operations in a transaction. If the query involves arguments of basic types such as integers, characters or strings, we assume that query closure can be achieved by choosing all their possible valued drawn from a restricted universe specified by the user.

The goal of query closure is that every new object that is created will have all the possible query methods run on it with all the combinations of the other objects that are active after the creation of the object.

EXAMPLE 6

The transaction shown in Example 4 is not query closed. For example, the query capacity is not run on any of the objects created. Furthermore, the length query is not run on objects $o_2,o_3,o_4,o_5,o_6$ during the transaction. However, the transaction may be modified to yield the following query closed transaction; Transaction 2:

| | |
|---|---|
| $op_1$: | $o_1$←createStack(10) |
| $op_2,q_0$: | 0←length($o_1$) |
| $q_1$: | 10 ← capacity($o_1$) |
| $op_3$: | $o_2$← createStack(2) |
| $q_2$: | 0← length($o_2$) |
| $q_3$: | 2 ← capacity($o_2$) |
| $op_4$: | $o_3$← pushStack($o_2^+$,ptrOx32) |
| $q_4$: | 1 ←length($o_3$) |
| $q_5$: | 2 ←capacity($o_3$) |
| $op_5$: | $o_4$ ← pushStack($o_3$+, ptrOx45) |
| $q_6$: | 2 ←length($o_4$) |
| $q_7$: | 2 ← capacity($o_4$) |
| $op_6$: | ($o_5$, ptrOx0) ← popStack($o_1^+$) |
| $q_8$: | 0← length($o_5$) |
| $q_9$: | 10← capacity($o_5$) |
| $op_7$: | ($o_6$, ptrOx45) ←popStack($o_4^+$) |
| $q_{10}$: | I ←length($o_6$) |
| $q_{11}$: | 2 ←capacity($o_6$) |

By convention, we let $q_i$ denote a query while $op_i$ denote a non query function call in a transaction. With each query function $f_i$, we denote a predicate:

$queryResult\_f_i(o_1, \ldots, o_n, r_1, \ldots r_m)$, wherein $o_1, \ldots, o_n$ denote the IDs of the parameters to the query while $r_1, \ldots r_m$ denotes the values of the results returned by the query.

Note that the operation ID corresponding to the query does not form any part of our query result predicate. The predicate is assumed to be a property of its argument objects $o_1, \ldots, o_n$ and not specific to the system state at the time of its execution. In practice, however, certain queries are intended to capture the system state at the time of the execution. In such situations, it is necessary to have the operation ID $op_j$ be a part of the query result predicate (file operation example provided later in the paper).

LEARNING SPECIFICATIONS: So far, we have presented the notion of transactions on an API and shown how to represent the transaction in terms of relations. We now present a technique for mining these relations to learn interesting patterns about them. Inductive Logic Programming (ILP) is a basic technique that permits us to mine relational data for declarative specification. The present approach is to use these tools almost as a black box to learn declarative specification from relational data obtained by running transactions.

Inductive Logic Programming: Inductive Logic Programming (ILP) is a relational data mining technique that seeks to learn, e.g., Prolog (Datalog) programs given some relational data, a target concept and background knowledge about the structure of the target program.

Let $p_1, \ldots, p_m$, be a set of relations over domains $D_1, \ldots D_k$. Let p be a target relation which we would like to specify in terms of itself and the other predicates using a datalog program. An ILP problem instance needs the following inputs;

The relations $p_1, \ldots, p_m$,

Positive tuples that belong to the target relation p and negative examples of tuples that lie outside the target relation p, Optionally, background knowledge that restricts the syntactic structure of the clause.

The output of an ILP instance is a set of clauses $C_1, \ldots, C_m$. Each clause $C_i$ is of the form:

$$C_i: p(\ldots):-p_{i_1}(\ldots), \ldots, p_{i_k}(\ldots).$$

The clauses conform to the syntactic restrictions specified as part of the background knowledge. Together the disjunction of all the clauses cover all the positive examples and exclude all the negative examples provided.

EXAMPLE 7

Consider the domain of people, People=$\{m_1, m_2, m_3, m_4, m_5, f_1, f_2, f_3, f_4, f_5\}$ Consider the relations father and mother including the tuples shown below:

| Father | | Mother | |
|---|---|---|---|
| $m_1$ | $f_2$ | $f_1$ | $f_2$ |
| $m_1$ | $m_3$ | $f_1$ | $m_3$ |
| $m_2$ | $m_4$ | $f_2$ | $m_5$ |
| $m_2$ | $m_5$ | $f_2$ | $m_4$ |
| $m_3$ | $f_3$ | $f_4$ | $f_5$ |
|  |  | $f_4$ | $f_3$ |

We wish to learn the target predicate sibling. As an input, we provide both positive and negative examples for the target predicate.

| Sibling | | ¬Sibling | |
|---|---|---|---|
| $m_3$ | $f_2$ | $f_2$ | $m_5$ |
| $f_2$ | $m_3$ | $m_4$ | $f_2$ |
| $f_3$ | $f_5$ | $f_1$ | $m_3$ |
| $f_5$ | $f_3$ | $f_3$ | $f_1$ |
| $m_4$ | $m_5$ | $m_1$ | $m_5$ |
|  |  | $m_3$ | $f_5$ |

We assume for the time being that no background knowledge is present other than the structure of the relations that form the ILP instance.

An ILP learner seeks to cover all the positive examples. This is achieved by repeatedly (a) choosing an uncovered positive example, (b) constructing a saturation clause that explains the positive example and (c) generalizing this clause to cover as many positive examples as possible and no negative example. The generalized clause is added to the pool of learned clauses and the positive examples covered by it are removed from the uncovered set. This process is best illustrated by an example.

EXAMPLE 8

Consider the ILP instance in Example 7. We choose the positive example $<m_3, f_2>\in$ sibling. The relevant tuples concerning $m_3$, $f_2$ are: father$(m_1, m_3)$, mother$(f_1, m_3)$, father$(m_1, f_2)$, mother$(f_1, f_2)$. These tuples enable us to construct the following saturation clause by generalizing domain values by means of variables:

sibling(X, Y):—father(M, X), father(M, Y), mother(F, X), mother(F, Y).

Upon examination of the data, this clause can be seen to cover all but one of the positive examples and none of the negative examples (and is therefore nearly an ideal clause). We now consider various generalizations of this clause. One of the important generalizations is to drop antecedents from the clause in a bid to cover more positive examples and none of the negative examples. Note that this is not the only generalization possible. Many solvers may consider other means of generalizations such as making two instances of the same variable distinct, adding new predicates (abduction) and so on.

Let us consider the following generalizations of the saturated clause along with the number of positive and negative examples that satisfy the clause:

sibling(X, Y):—father(M, X), mother(F, Y)|(5,6)
sibling(X, Y):—father(M, X), father(M, Y)|(5,0)
sibling(X, Y):—mother(F, X), mother(F, Y)|(6,0)

Note that among all the clauses the last one is ideal since it explains all the positive examples and none of the negative examples. It is therefore added to the set of learned rules. Since there are no uncovered positive examples left, the final learned program includes a single clause: C: sibling(X, Y):—mother(F, X), mother(F, Y).

Note that while this is in accordance with the familiar concept of a sibling, one would have also expected the following clause to be learned: C': sibling(X, Y):—father(M, X), father(M, Y).

However, due to a bias in the data, the previous clause C is enough to explain all the data that can be explained by C'.

Learning Target Specifications: ILP can be used to learn specifications for some target behavior given the output of many transactions carried out on a library. In general, the target is chosen by the user depending on the intended application and specified as a part of the learning problem. Common examples of targets include an operation in the transaction throwing an exception, an assertion violation, segmentation violation, returning a special value of interest, printing a specified message on the output and so on. We assume that the target predicate is instrumented by the user so that positive and negative examples of the predicate are available by examining the transaction.

We seek to predict the conditions under which a call to the function $f_i$ throws an exception. The target predicate is of the form throwsException(f, op), indicating that a function call to f during an operation op throws an exception. It is possible to instrument transactions to print positive examples of the predicate whenever an operation throws an exception and negative examples otherwise.

Let $O_1, \ldots, O_N$ be a set of transactions run on the library whose behavior we seek to infer. We assume that these transactions are the results of running some user designed unit tests. We will discuss schemes for transaction generation. Let us assume that the set of operation IDs and object IDs involved in some transaction $\mathbf{0}_j$, is disjoint from the set for a different transaction $\mathbf{0}_j$. We also assume that each transaction is query closed. We convert the transactions into relations using the predicates fnCalled, fnArg$_i$, fnRes$_i$, queryResult_f$_i$ as discussed above. Furthermore, the outcome of the target predicate (e.g., exception being thrown) is tested at the end of each operation and classified as a positive or negative instance. The user may provide some background knowledge (hints) that constrains the search for rules. The nature of this knowledge and its effect on the learning method will be discussed subsequently.

The data thus collected forms an ILP instance and is fed to an off-the-shelf ILP solver used as a black box to output clauses that specify the target behavior in terms of the relations provided.

EXAMPLE 9

Consider the transaction shown in Example 6. We use the target popReturnsNullPtr(op_id) The only positive example for the target is popReturnsNullPtr($op_6$), while all the other operations form negative examples. In general, the amount of data involved in this instance is quite small. Learning methods perform well only when data is available from a variety of transactions, each exercising a variety of situations. For example, if the data volume is insufficient, the result may vary widely depending on the search heuristic employed.

For instance, the clause:
popReturnsNullPtr(X):—fnCalled(X, "pop"),
   $fnArg_1$, (X, stack_t, S),
   queryResult("capacity", S, Y),
   Y=10.
states that a pop operation returns NULL whenever the capacity of its first argument is 10. This clause covers the single positive instance and excludes all the negative instances in this case. Nevertheless, it is possible in principle (by choosing the right search heuristics) for this example to yield the clause:
popReturnsNullPtr(X):—fnCalled(X, "pop"),
   $fnArg_1$(X, stack_t, S),
   queryResult("length", S, Y,
   Y=0.

The clause above states that pop operation may return null if the length of its argument is 0. The former clause can be avoided in the presence of enough data either because of negative examples of stacks with capacity 10 (but with 1 or more elements) that do not return a NULL on pop, or more positive examples with different capacities but length 0 that return a NULL on pop. We have observed that given higher data volumes, it is possible to reliably learn this clause using a variety of heurstics.

Background Knowledge: Different types of background knowledge are addressed that can influence the search process. We distinguish between two different types of background knowledge (a) Structural information about the clauses, and (b) User defined predicates that may be used in the learning process.

Structural Knowledge. It is possible to annotate clauses using structural information. The exact form of this information varies depending on the search used by the ILP learner. In general, it is possible to restrict the possible combination of predicates that may form a part of the body of a clause by means of mode information about predicates. Let $p(x_1, \ldots, x_m)$ be a predicate in an ILP problem instance. A mode annotation for p classifies each input argument $x_i$ into one of three categories (a) an input variable $x_i^+$, (b) an output variable $x_i^-$ or (c) a constant $x_i^\#$.

The ILP learner uses mode annotations to learn clauses according to the following rules: (1) Any term X that instantiates an argument $x_i^+$ in the body of a clause must appear in the head as an input argument instantiation, or as an output argument of a clause that appears earlier in the body. (2) Any argument $x_i^\#$ is always instantiated by a constant term.

By annotating arguments with modes, it is possible to speed up the search by restricting the set of clauses that it can consider. The annotations themselves are easy to derive with a bit of experience with ILP tools. For instance, to learn exception behavior, one may use the following mode annotations:

throwsException($op^+$, $fn^\#$), fnCalled($op^+$, $fn^\#$)
$fnArg_i(op^+, typ^\#, obj\_id^-)$, $fnRes_i(op^+, typ^\#, obj\_id^-)$
queryResult_fn($ob_1^+, \ldots, ob_n^+, r_1^-, \ldots, r_m^-$), opSucc($op^{31}$, $op^-$)

The mode annotations used above are designed to restrict the focus of the search for a clause based on a positive instance to consider the operation involved in the instance along with the arguments, results of this operation and that of a bounded number of previous operations. This saves effort during the search by avoiding the need to consider operations that may be unlikely to have a bearing on the current operation, its arguments and results.

The other type of background information that is useful while learning clauses is to consider user defined predicates as part of the clauses that can make up the body of a rule. For example, consider a routine for copying one stack into another that throws an exception when their capacities are not equal. To learn this behavior, a predicate is needed that defines disequality. Depending on the tool used, such a predicate may not be built-in and need to be defined explicitly by the user. However, once a library of such predicates is defined, the learner may use such predicates in the body of the learned clauses.

Background knowledge may also be provided in the form of dependency information between the target predicate and the different predicates used in the data. In general, if a predicate $p_i$ is known not to affect the target predicate p, it need not be considered by the learner while inferring the specification for p.

TRANSACTION GENERATION: We now turn to the automatic generation of transactions given a library with an API signature <T,Func>. One embodiment relies on the generation of random unit tests. These unit tests are instrumented to yield the relations that form the inputs to the learning problem. The unit test generator (104, FIG. 1) is called repeatedly in the present framework and the resulting relations are merged with those collected from previous unit tests.

Random Unit Tests: Our approach for generating random unit tests first constructs a fixed size pool of object references to each type in the signature. The size of this pool is preferably a user input. The pool for basic types such as "int", "char" are constructed by using random number generators. Arrays of basic types such as strings and integer arrays are constructed by allocating memory with randomly chosen length and filling the allocated arrays with randomly generated content.

Pools of compound objects are then constructed by using allocator methods for these objects. In principle, any method that returns a reference to an object of type t can be thought of as an allocator for the type. However, during the construction of the object pool, not all such methods are suitable. For example, the pushStack method for the stack API in FIG. 2 is unsuitable for constructing a stack object pool, since it needs a stack object as an argument that is destroyed by the call. The allocators and the order of object allocations are selected by analyzing the parameter graph of the API signature following the approach of Csallner and Smaragdakis (See CSALLNER, C., AND SMARAGDAKIS, Y., "Jcrasher: an automatic robustness tester for Java"; Softw., Pract. Exper. 34, 11 (2004), 1025-1050.

Once all the objects in the pool are allocated, the unit test generator repeatedly chooses non-query methods at random and executes them with inputs chosen randomly from the pool. The outputs obtained are added back to the object pool, while the arguments destroyed by the method are removed. By removing objects that are destroyed by a function call, we ensure that their object IDs are not used in subsequent operations.

After each operation, each query method in the API is run on all possible combinations of inputs drawn from the pool. The unit test generated by the present system/method can be instrumented to generate the transaction and the relations needed for the ILP learner. This is achieved by numbering different operations issued by the unit test and the objects produced/consumed by these operations. The test generator is also instrumented based on the target predicate chosen by the user. For example, to learn the exception behavior, the unit test sets up exception handlers for various exceptions. Upon the receipt of an exception, a positive instance of the target predicate is generated. If an operation ends successfully without an exception being thrown, a negative instance of the corresponding target predicate is printed.

Each unit test is run for a fixed number of steps. Tests are stopped upon the throwing of an exception or the exhaustion of a resource such as time/memory. The unit test generator is also reseeded repeatedly to enhance randomization. The relations obtained from different unit tests are all merged (after renumbering object and operation IDs to make them unique). They may be fed directly into an ILP learner to learn specifications.

Learning specifications for different libraries using an automatic unit test generator and the ILP learning tool Aleph are described along with the successes of the tool in learning complex specifications automatically without the benefit of the source code. Potential applications of this method to various problems in software development and validation will also illustratively be described.

Software Specification Mining. The automatic inference of API specifications for software libraries in accordance with the present principles uses a notion of transactions extracted from traces. The present approach formulates random unit tests in a bid to explore all the behaviors including the exceptional ones. The present approach is dynamic and relies on issuing test cases to the library rather than a static analysis of application code.

Randomized Unit Testing. The present principles use randomized unit tests to generate transactions. Randomization is used in lieu of an exhaustive exploration of the space of all calling patterns.

Inductive Logic Programming. Inductive Logic Programming is a relational data-mining technique that seeks to infer prolog/datalog programs from relational data. ILP learning algorithms perform a search on the space of permissible Horn clauses to discover rules that cover all the positive examples and none of the negative examples. However, in the presence of contradictions in the data due to noise, the learned clauses may cover some of the negative examples. Other approaches to the problem have used inverted resolution operators to induce clauses from the given data.

Having described preferred embodiments of a system and method for mining library specifications using inductive learning (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for mining program specifications, comprising:
    based upon an application program interface (API) signature, generating unit tests to exercise functions of a library through the API, wherein the generating unit tests are based upon instrumentation to define interests and a target behavior;
    determining a response to the unit tests to generate a transaction in accordance with the target behavior;
    converting the transaction into a relational form using a processor; and
    learning specifications of the library using an inductive logic programming tool from the relational form of the transaction, wherein learning specifications includes expressing an occurrence of the target behavior in terms of a usage pattern of the unit tests.

2. The method as recited in claim 1, wherein generating unit tests includes generating random unit tests.

3. The method as recited in claim 1, wherein learning specifications of the library includes describing operation of the library without access to source code of the library.

4. The method as recited in claim 1, further comprising reverse engineering library internals using learned specifications.

5. The method as recited in claim 1, wherein learning specifications includes learning declarative specifications from relational data obtained by running the transaction.

6. A system for mining program specifications, comprising:
    a unit test generator configured to generate unit tests to exercise functions of a library through an application program interface (API), wherein the generating unit tests are based upon instrumentation to define interests and a target behavior;
    a compiler configured to compile and link library responses to the unit tests and user instrumentation which provides target behavior to generate transactions; and
    an inductive logic programming tool configured to convert the transactions into a relational form and learn specifications of the library using from the relational form of the transaction, wherein learning specifications includes expressing an occurrence of the target behavior in terms of a usage pattern of the unit tests.

7. The system as recited in claim 6, wherein the test generator generates random unit tests.

8. The system as recited in claim 6, wherein specifications are learned from the library in terms of a usage pattern of the unit tests.

9. The system as recited in claim 6, wherein the specifications of the library include operating system functionalities, data structure implementations, utilities and database processing.

10. A non-transitory computer readable medium comprising a computer readable program for mining program specifications, wherein the computer readable program when executed on a computer causes the computer perform the steps of:
    based upon an application program interface (API) signature, generating unit tests to exercise functions of a library through the API, wherein the generating unit tests are based upon instrumentation to define interests and a target behavior;

determining a response to the unit tests to generate a transaction in accordance with a the target behavior;

converting the transaction into a relational form; and learning specifications of the library using an inductive logic programming tool from the relational form of the transaction, wherein learning specifications includes expressing an occurrence of the target behavior in terms of a usage pattern of the unit tests.

11. The non-transitory computer readable medium as recited in claim 10, wherein generating unit tests includes generating random unit tests.

12. The non-transitory computer readable medium as recited in claim 10, wherein learning specifications of the library includes describing operation of the library without access to source code of the library.

13. The non-transitory computer readable medium as recited in claim 10, further comprising reverse engineering library internals using learned specifications.

14. The non-transitory computer readable medium as recited in claim 10, wherein learning specifications includes learning declarative specifications from relational data obtained by running the transaction.

* * * * *